United States Patent
Wade et al.

(10) Patent No.: US 10,499,672 B2
(45) Date of Patent: Dec. 10, 2019

(54) ON-DEMAND POPCORN DISPENSER

(71) Applicant: VALIDFILL LLC, Bradenton, FL (US)

(72) Inventors: Jeremy Wade, Bradenton, FL (US); Peter Dorney, Winter Springs, FL (US)

(73) Assignee: ValidFill LLC, Bradenton, FL (US)

( * ) Notice: Subject to any disclaimer, the term of this patent is extended or adjusted under 35 U.S.C. 154(b) by 169 days.

(21) Appl. No.: 15/597,508

(22) Filed: May 17, 2017

(65) Prior Publication Data

US 2017/0332678 A1 Nov. 23, 2017

Related U.S. Application Data

(60) Provisional application No. 62/338,121, filed on May 18, 2016.

(51) Int. Cl.
*A23L 7/187* (2016.01)
*G06Q 10/08* (2012.01)

(52) U.S. Cl.
CPC ............ *A23L 7/187* (2016.08); *G06Q 10/087* (2013.01)

(58) Field of Classification Search
CPC .... A23L 7/187; A23V 2002/00; G06Q 10/087
See application file for complete search history.

(56) References Cited

U.S. PATENT DOCUMENTS

| | | | |
|---|---|---|---|
| 7,009,519 B2 | 3/2006 | Leonard et al. | |
| 7,032,818 B2 | 4/2006 | Thomas et al. | |
| 7,063,263 B2 | 6/2006 | Swartz et al. | |
| 7,258,276 B2 | 8/2007 | Linton et al. | |
| 7,680,691 B2 | 3/2010 | Kimball et al. | |
| 9,334,150 B1 | 5/2016 | Ost et al. | |
| 2009/0056558 A1* | 3/2009 | Cretors et al. | A23L 7/187 99/323.8 |
| 2010/0125362 A1 | 5/2010 | Canora et al. | |
| 2013/0280386 A1* | 10/2013 | Cretors | A23L 7/187 426/233 |

* cited by examiner

*Primary Examiner* — Kevin L Lee
(74) *Attorney, Agent, or Firm* — Buchanan Ingersoll & Rooney PC

(57) ABSTRACT

Embodiments of the system can relate to a popcorn dispenser system that may be configured for tracking popcorn and/or other items associated with the dispensement of popcorn. Some embodiments can include the use of markers to generate tracking information. Some embodiments can include use of modifiable markers to generate additional tracking information. The popcorn dispenser system can include devices that facilitate producing popped corn on-demand, which may include providing popped corn from un-popped kernels in specified amounts, at specified times, and/or with specified flavors.

20 Claims, 11 Drawing Sheets

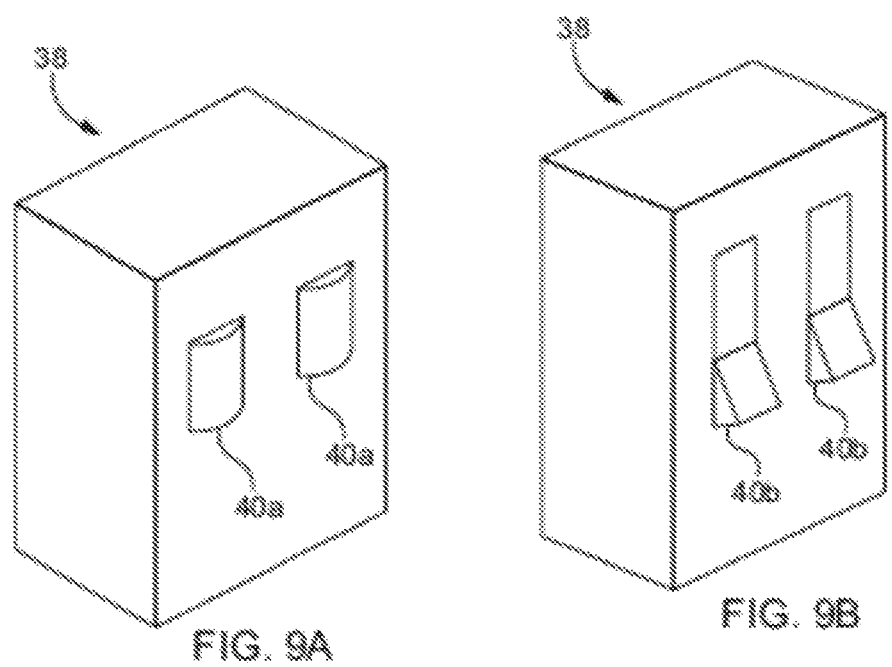
FIG. 9A
FIG. 9B
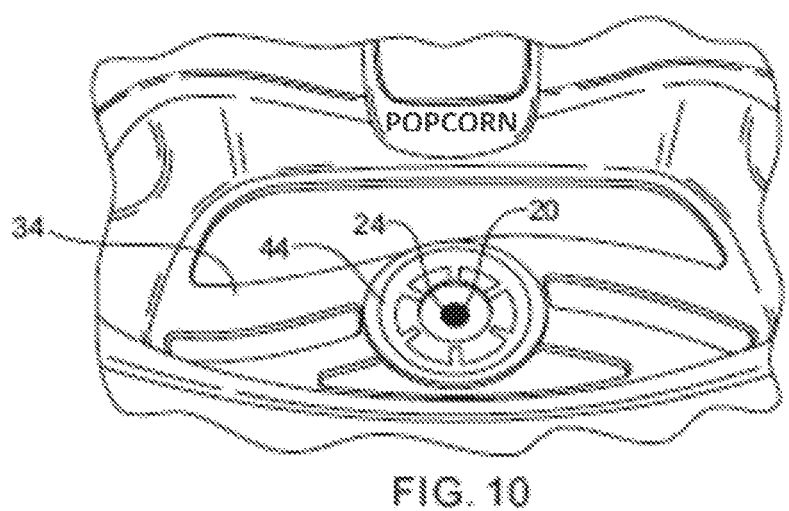
FIG. 10

ON-DEMAND POPCORN DISPENSER

CROSS-REFERENCE TO RELATED APPLICATIONS

This patent application is related to and claims the benefit of U.S. Provisional Application Ser. No. 62/338,121, filed May 18, 2016 and titled "On-Demand Popcorn Dispenser, the entire contents of which is incorporated herein by reference.

FIELD OF THE INVENTION

Embodiments of the invention can relate to a popcorn dispenser system that may be configured for tracking popcorn and/or other items associated with the dispensement of popcorn. Some embodiments can include the use of markers to generate tracking information. Some embodiments can include use of modifiable markers to generate additional tracking information.

BACKGROUND OF THE INVENTION

Conventional systems and methods of dispensing popcorn consist of a popcorn machine that produces popcorn in batches, regardless of the demand for the popcorn. When a customer purchases a serving, the serving is taken from the batch and supplied to the customer. This can lead to overproduction of popcorn and/or a waste of resources used to produce the popcorn. For example, a batch may be made due to an expected demand, but the demand for the popcorn may be less than expected. As some point the popcorn stales and must be discarded. It can be difficult to determine when staling occurs and/or which portions of the popcorn batch are stale. Such difficulties may be exacerbated when more than on batch is made by the popcorn machine, where the plurality of batches are contained in a storage bin before being served.

Another problem exhibited by conventional popcorn systems and methods can be reduced supply chain and/or inventory control management. Producing items in a batch process tends to limit the flexibility and robustness of the process, which may impede implementation of efficiency-related improvements to the process. A further drawback of conventional popcorn systems can be a reduced ability to provide customization. For example, a first batch of popcorn may be suitable for certain types of toppings, seasoning, and/or flavoring, but not suitable for other types of toppings, seasoning, and/or flavoring. Thus, with conventional systems, a customer can be limited to purchasing popcorn with few customizable options. Yet another drawback of existing popcorn systems can be the lack of information tracking associated with the purchase and consumption of popcorn, marketing information, pricing information, etc. Such information can be helpful in supply chain management, inventory control, pricing, marketing, etc.

SUMMARY OF THE INVENTION

Embodiments of the system can include a tracking device. The tracking device can include at least one marker configured to be associated with a popcorn container and/or a token. The at least one marker may have at least one property. The at least one property may be identifiable to generate first tracking information. The popcorn container and/or the token may be associated with a kernel, popped corn, and/or an additive. The device can further include a popcorn dispensing apparatus configured to store the kernel and/or the additive. The popcorn dispensing apparatus may be further configured to generate the popped corn from the kernel. The popcorn dispensing apparatus can be further configured to dispense the popped corn into the popcorn container. In some embodiments, the at least one property can be modifiable. The at least one modified property may be identifiable to generate second tracking information. In some embodiments, the first tracking information and the second tracking information can be used to identify, track, and/or monitor at least one attribute of the popcorn container and/or a token.

In some embodiments, the first tracking information and the second tracking information can be used to identify, track, and/or monitor at least one attribute of the popcorn container and/or token, the at least one attribute of the kernel, the popped corn, the additive, at least one use of the popcorn container and/or token, and/or at least one use of the kernel, the popped corn, and/or the additive. In some embodiments, the at least one modified property can be further modifiable. In some embodiments, the at least one property and/or the at least one modified property can further include at least one of a physical property, a chemical property, an optical property, a magnetic property, an electrical property, a programmed code, a readable property, a non-readable property, a pattern, and a disappearing property. In some embodiments, the at least one property and/or the at least one modified property can be modifiable due to the at least one marker being subject to at least one condition.

In some embodiments, being subject to the at least one condition can include at least one of exposure to the at least one condition and removal from exposure to the at least one condition. In some embodiments, the at least one condition can include at least one of electromagnetic radiation, an electric field, a magnetic field, a chemical, heat energy, pressure, acoustic energy, and physical contact. In some embodiments, the at least one condition can further include at least one of magnitude, intensity, rate of change, frequency, and vector direction of the at least one condition. In some embodiments, the at least one property and/or the at least one modified property can be modified by at least one of changing all at once, changing incrementally, changing as a function with which the at least one marker is subject to the at least one condition, and changing as a function of time. In some embodiments, the at least one property and/or the at least one modified property can be modified by at least one of changing as a function of intensity, rate, and frequency with which the at least one condition occurs.

In some embodiments, the at least one property can include a plurality of properties and/or the at least one modified property comprises a plurality of modified properties. In some embodiments, a plurality of conditions can generate a single change in a single property and/or a single change in a single modified property. In some embodiments, a single condition can generate a change in a plurality of properties and/or a change in a plurality of modified properties. In some embodiments, the at least one property and/or the at least one modified property can be identifiable and/or not identifiable by a reader. In some embodiments, the at least one property and the at least one modified property can generate at least one readable state and/or at least one non-readable state.

In another exemplary embodiment a tracking system can include at least one marker associated with a popcorn container and/or a token. The at least one marker can have at least one property. The at least one property can be identifiable to generate first tracking information. The at least one property can be modifiable. The at least one modified property can be identifiable to generate second tracking information. The at least one property and/or the at least one modified property can be modifiable due to the at least one marker being subject to at least one condition. The system can further include a popcorn dispensing apparatus. The popcorn dispensing apparatus can include at least one reader configured to capture the first tracking information and/or the second tracking information. The popcorn dispensing apparatus can further include at least one condition source configured to subject the at least one marker to the at least one condition. The popcorn dispensing apparatus can further include at least one processor configured to receive and process the first tracking information and/or the second tracking information to identify, track, and/or monitor at least one attribute of the popcorn container and/or a token and/or use of the popcorn container and/or a token. Some embodiments of the tracking system can further include a reset device.

In another exemplary embodiment, a popcorn dispensing apparatus can include a kernel compartment configured to store at least one type of kernel. The popcorn dispensing apparatus can further include an additive compartment configured to store at least one type of additive. The popcorn dispensing apparatus can further include a heating compartment. The popcorn dispensing apparatus can further include a means to transfer at least one of the kernel and additive in predetermined amounts to a heater compartment to transform the kernel into popped corn. The popcorn dispensing apparatus can further include an air pop feed to dispense the popped corn to a popcorn container. The popcorn dispensing apparatus can further include a reader configured to capture tracking information from a marker associated with the popcorn container. The popcorn dispensing apparatus can further include a condition source configured to subject the marker to a condition. The popcorn dispensing apparatus can further include a processor configured to receive and process the tracking information to identify, track, and/or monitor at least one attribute of the popcorn container, the kernel, the additive, and/or the popcorn. The popcorn dispensing apparatus can further include a control module. The popcorn dispensing apparatus can further include a mixing compartment.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings identify like components:

FIGS. 9A-9B show perspective front and perspective rear views, respectively, of an embodiment of a popcorn container receptacle that may be used with the system.

FIG. 10 is an embodiment of a dispensing apparatus, showing a partial view of a tray portion that may be used with the system.

FIG. 11B is a continuation of FIG. 11A.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1A:
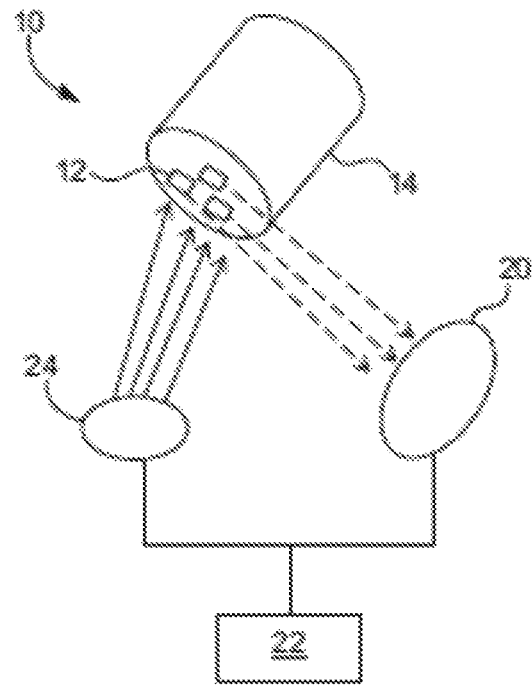
FIG. 1A is an embodiment of the system including an embodiment of a popcorn container with markers.
Figure 1B:
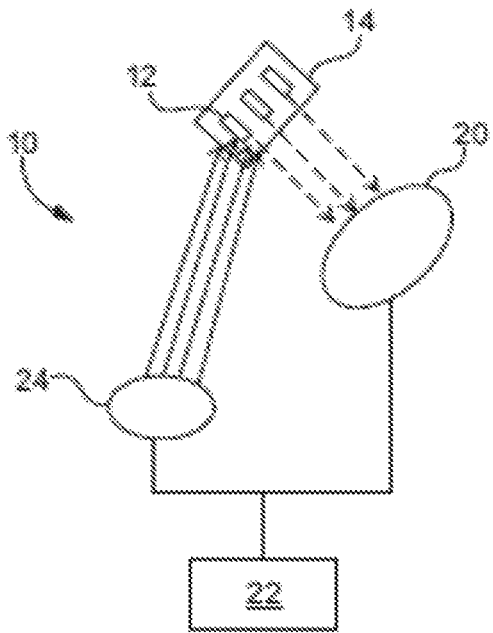
FIG. 1B is an embodiment of the system including an embodiment of a token with markers.

Referring to FIGS. 1A-1B, the system 10 can include at least one marker 12. The marker 12 may be associated with an item 14. Being associated with can include being placed in, placed on, physically attached to, chemically bonded to, in electrical connection with, in wireless communication with, or otherwise coupled to the item 14. The marker 12 can be used to identify, track, and/or monitor an item 14 and/or an object 16 associated with the item 14. For example, the item 14 may be a popcorn container. The object 16 may be popcorn being dispensed within the popcorn container, popcorn consumed from the popcorn container, etc.

The identifying, tracking, and/or monitoring can include identifying, tracking, and/or monitoring at least one attribute or characteristic of the item 14 and/or object 16. For example, an attribute or characteristic can include the type of popcorn, the amount of popcorn, the frequency the popcorn is dispensed, a quality of the popcorn (e.g., calorie content, mushroom-type popcorn kernels, butterfly-type popcorn kernels, sugar content, salt content, butter content, sunflower oil content, etc.), additives to the popcorn (e.g., butter, salt, seasoning, garlic, hot sauce, caramel, chocolate, or other toppings), the amount paid for the popcorn, the type of payment used, the time and date of dispensement of popcorn, the location the dispensement of popcorn occurred, the dispensing apparatus 18 (see FIG. 4) that dispensed the popcorn, the popcorn container size, the popcorn container type, etc.

The marker 12 can include an information-bearing mark. This can include paint, ink, barcode, fluorescent pigment, magnetic strip material, condition-response smart material, embossed material, imprinted material, Radio Frequency Identification ("RFID") tag (active or passive), etc. The marker 12 can be embedded within the item 14, printed on the item 14, written as code on the item 14, attached as a film on the item 14, etc. Any one type or a combination of types of markers 12 can be used. The marker 12 can be configured to exhibit a certain detectable property (e.g., have a certain shape, have a certain thickness, have a certain pattern, emit a certain wavelength, generate a certain chemical response, emit a certain signal, have a certain temperature, exhibit a certain optical, magnetic, and/or mechanical property, etc.). This detectable property can be used as information for identifying, tracking, and/or monitoring the item 14 and/or object 16. For example, the marker 12 may be configured to be readable by a reader 20. In some embodiments, the information contained within the marker 12 can be acquisitioned by a reader 20.

Some markers 12 can be set with a defined property so that the information obtained therefrom is not changed (e.g., a marker 12 can emit a certain wavelength of light at all times). These may be referred to as non-modifiable markers 12. Some markers 12 can be programmable and/or re-programmable with the information (e.g., a marker 12 can be readable and writable RFID tag ("read-write RFID tag"), magnetic strip, holographic mark, etc.). Some markers 12 can be configurable and/or re-configurable to generate a desired type of information (e.g., a marker 12 can be a condition-response smart material that emits light at a first wavelength under one condition and/or a second wavelength of light under a different condition). These may be referred to as modifiable markers 12. For example, the marker 12 can be a mark that experiences a change in property when subjected to a condition. The property can include physical property, chemical property, optical property, magnetic property, electrical property, a programmed code, a certain pattern, holographic image, etc. Other properties can include being readable by the reader 20, being non-readable by the reader 20, disappearing (e.g., degrade, deteriorate, and/or disintegrate) upon being subject to the condition, etc. Being subjected to a condition can include exposure to the condition and/or removal from exposure to the condition. The condition can include electromagnetic radiation, an electric field, a magnetic field, a chemical, heat energy, pressure, acoustic energy, physical contact, etc. A condition can further include magnitude, intensity, rate of change, frequency, vector direction, etc. of any of the conditions identified herein. A marker 12 may be configured to change in property due to one or combination of conditions.

The property of the marker 12 can be made to change all at once, incrementally, as a function with which the marker 12 is subject to the condition, etc. The property of marker 12 can be made to change as a function of another parameter, such as time for example. The change in the property can be instantaneous or over a predetermined period of time. For instance, the change in the property can be incrementally, but each incremental change can occur instantaneously or over a predetermined period of time. Further, the change in the property can be a function of the intensity, rate, frequency with which the condition occurs, etc. In some embodiments, the change can include the marker 12 changing from a first property to a second property upon being subject to the condition. The marker 12 can further change from the second property to a third property upon being subjected to the same and/or different condition.

The marker 12 experiencing a first condition only once may cause the marker 12 to change from the first property, to the second property, and then to the third property. Alternatively, the marker 12 may be configured to change in iterations. For example, the marker 12 can change from the first property to the third property in iterations due to successive subjection to the condition. For instance, the marker 12 experiencing a first condition may cause the marker 12 to change from the first property to the second property. The marker 12 may stay at the second property until it experiences another condition. The marker 12 experiencing the first condition again and/or a second condition may cause the marker 12 to change from the second property to the third property.

Any other combination and/or permutation of transitions from a property to another property can be achieved. For example, the marker 12 may change from the second property back to the first property upon experiencing the condition. The marker 12 can change from the third property back to the second property and/or the first property upon experiencing the condition. The marker 12 can change from the first property to the third property upon experiencing the condition. The marker 12 may include more or less property transitions. For example, a marker 12 may include only a first property and a second property to and from which the marker 12 can transition. As another example, the marker may include any number of properties to and from which the marker 12 can transition.

In some embodiments, a plurality of conditions can be used to generate any one or multiple of properties. For example, the first condition and the third condition may cause the marker 12 to change from the first property to the second property. Some embodiments may require a plurality of conditions to effectuate the change. Some embodiments may not require a plurality of conditions, but only permit the plurality of conditions to cause the change.

In some embodiments, any one or a plurality of properties can be generated by a single condition. For example, the first condition may cause the marker 12 to change from the first property to the second and third properties. Some embodiments may require the second and third properties to be effectuated by the first condition. Some embodiments may not require the second and third properties to occur in response to the first condition, but only permit the second and third properties to occur.

As noted above, the marker 12 can be configured to change from being readable to non-readable. This can include changing from a first readable state to a second readable state then to a non-readable state, for example. The change from the first readable state can be caused by the marker 12 being subjected to a first condition. This can include causing the marker 12 to change from the first readable state to the second readable state. The change from the second readable state can be caused by the marker 12 being subjected to a second condition. This can include causing the marker 12 to change from the second readable state to the non-readable state. The second condition can be the same as or different from the first condition.

It is contemplated that more or less intermediate readable states can exist between the first readable state and the non-readable state. For example, there may be no intermediary readable states at all (e.g., the marker 12 can be configured to change from a readable state to a non-readable state). As another example, there may be a third readable state, a fourth readable state, etc. It is also contemplated for some markers 12 to also be able to change from a non-readable state to a readable state. It is further contemplated for some markers 12 to be able to change from a readable state to a non-readable state and also from a non-readable state to a readable state. Thus, while examples herein may describe a marker 12 changing from a readable state to non-readable state, the description thereof can be equally applicable to the marker 12 changing from a non-readable state to a readable state.

In some embodiments, any one of the readable states and/or non-readable states can be generated by a separate condition. As a non-limiting example, a marker 12 may have four readable states and one non-readable state. A first condition may cause the marker 12 to change from the first readable state to the second readable state. A second condition may cause the marker 12 to change from the second readable state to the third readable state. A third condition may cause the marker 12 to change from the third readable state to the fourth readable state. A fourth condition may cause the marker 12 to change from the fourth readable state to the non-readable state. Any one of the first, second, third, and/or fourth conditions can be the same or different from another one. The transition trough the readable states can be linear or in successive order (e.g., the marker 12 may be configured to transition from the first readable state, then to the second readable state, then to the third readable state, then to the fourth readable state, then to the non-readable state). The transition trough the readable states can be non-linear or not in successive order. For example, the marker 12 may be caused to change from the first readable state to the fourth readable state. As another example, the marker 12 can be caused to change from the third readable state to the first readable state.

In some embodiments, a plurality of conditions can be used to generate any one or a multiple of the readable states and/or the non-readable states. For example, the first condition and the third condition may cause the marker 12 to change from the first readable state to the second readable state. Some embodiments may require a plurality of conditions to effectuate the change. Some embodiments may not require a plurality of conditions, but only permit the plurality of conditions to cause the change.

In some embodiments, a plurality of readable states and/or non-readable states can be generated by a single condition. For example, the first condition may cause the marker 12 to change from the first readable state to the second and the third readable states. Some embodiments may require the second and third readable states to be effectuated by the first condition. Some embodiments may not require the second and third readable stated to occur in response to the first condition, but only permit the second and third readable states to occur.

The readable or non-readable states can be defined by the properties of the marker 12. For example, the first readable state can be defined by a first wavelength of light the marker 12 emits. This may allow the marker 12 to be read by a first reader 20. Upon being subjected to the first condition, the marker 12 may then be caused to exhibit a certain magnetic property. This may define the second readable state. The second readable state may be a readable state or a non-readable state. For example, this may allow the marker 12 to be read by a second reader 20 or it may prevent it from being read by the second reader 20. Upon being subjected to the third condition, the marker 12 may then be caused to emit a second wavelength of light. This may define the third readable state. The third readable state may be a readable state or a non-readable state. For example, this may allow the marker 12 to be read by, or prevent the marker 12 from being read by, a third reader 20 and/or the first reader 20.

Some readable states can be defined by the marker 12 being able to be read by any one or any combination of readers 20. For example, the second readable state may be defined by the first and the second readers 20 being able to read the marker 12. Some embodiments may require the first and second reader 20 being able to read the marker 12 to define the second readable state. Some embodiments may not require the first and second reader 20 being able to read the marker 12 to define the second readable state, but define the second readable state by the fact that the first and second readers 20 can read the marker 12. Some non-readable states can be defined by the marker 12 not being able to be read by any one or any combination of readers 20. For example, the non-readable state may be defined by the first and the second readers 20 not being able to read the marker 12. Some embodiments may require the first and second reader 20 not being able to read the marker 12 to define the non-readable state. Some embodiments may not require the first and second reader 20 not being able to read the marker 12 to define the non-readable state, but define the non-readable state by the fact that the first and second readers may not be able read the marker 12.

The system 10 can further include at least one reader 20. The reader 20 can be configured to capture the information stored within, being emitted from, or otherwise encompassed by the marker 12. The reader 20 can be a scanner, a camera or some other imaging device, a charge-coupled device, an ultrasonic transducer array, magnetic strip reader, a photodetector array, and/or or some other sensing means. The reader 20 may further include at least one processor 22. In some embodiments, the processor 22 can be separate from the reader 20. The processor 22 may be in electrical communication with the reader 20 and/or a marker 12. This can include a hardwire connection and/or a wireless connection. Any of the wireless connections disclosed herein can be achieved by at least one component having a transceiver unit configured to facilitate wireless communication. For example, the processor 22 and the reader 20 may each have a transceiver unit.

Figure 2:
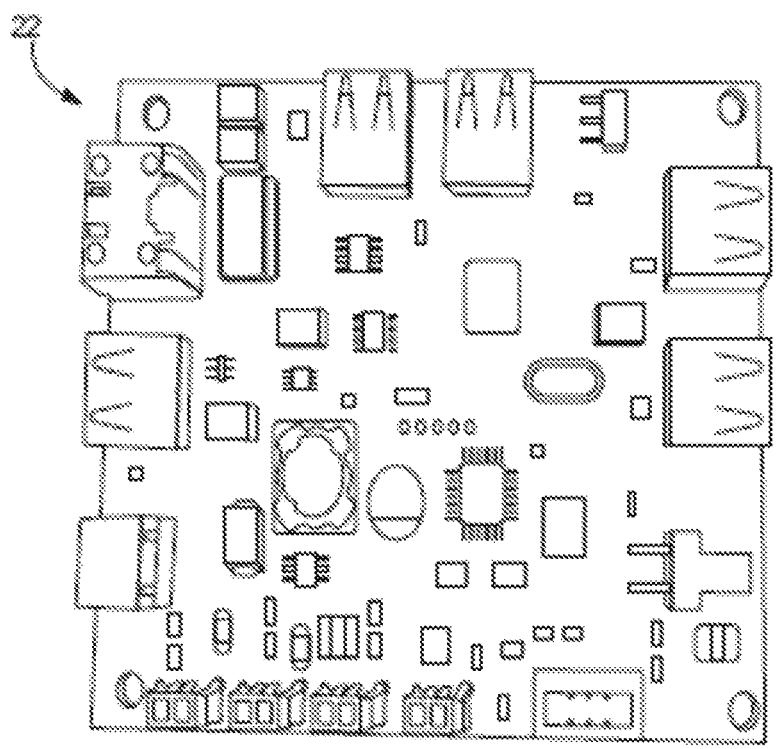
FIG. 2 is an embodiment of a processor that may be used with the system.

Referring to FIG. 2, the processor 22 can include a processing unit operatively associated with a non-transitory, nonvolatile memory. The processor 22 can be a microprocessor, a microchip, a controller (e.g., a programmable logic controller), an input/output control board, etc. The processor 22 can include programmable software. The programmable software may be stored in the memory. Some embodiments can include a plurality of processors 22. The plurality of processors 22 may be configured to form a computer system. For example, the plurality of processors 22 may be in communication with each other to form a computer network. The computer system may include at least one database. The computer system may further include at least one server. Modems, gateways, communication interfaces, etc. may be used to facilitate communication between any components of the computer system and/or facilitate coordinated transfer of data between any component of the computer system. At least one of the processors 22 can be a computer device (e.g., a desktop, laptop, tablet, cellphone, mobile electronic device, etc.). The computer device may be configured to generate a user interface ("UI"). The UI may be used by a user to interact with the system 10, issue commands to any of the processors 22, program and reprogram any of the processors 22, acquisition data from any of the processors 22, etc. The computer device can transmit and/or receive data from the processor 22. The computer device can further digitize, store, configure, and/or manipulate the data received by the processor 22. The UI may be configured to facilitate identifying, tracking, and/or monitoring of the item 14 and/or object 16 via the computer device.

Any of the processors 22 disclosed herein can be in electro-mechanical connection with any system 10 component. For example, any processor can be in electro-mechanical connection with any of the dispensing apparatuses 18, readers 20, reset devices 36, condition sources 24, printers 42, and/or any other system 10 component. This may allow the processor 22 to cause the component to perform a certain way. This can be achieved, for example, via application programming interface (API) software.

In some embodiments, the processor 22 can be programmed to receive tracking information from the marker 12 and/or the reader 20. The processor 22 can be further programmed to digitize, store, configure, and/or manipulate the tracking information. The processor 22 may be further programmed to transmit data to the reader 20 and/or to a marker 12. This data may be data that was transmitted to the processor 22 by the computer device. In some embodiments, the data can be transmitted first to the reader 20 and then to the marker 12. In some embodiments, the data can be transmitted first to the marker 12 and then to the reader 20. In some embodiments, the data can be transmitted to the reader 20, whereby the reader transmits the data, or at least a portion of it, to the marker 12. In some embodiments, the data can be transmitted to the marker 12, whereby the marker 12 transmits the data, or at least a portion of it, to the reader 20. The data transmitted to the reader 20 and/or marker 12 can cause the reader 20 and/or marker 12 to perform in a certain way.

Referring back to FIGS. 1A-1B, the system 10 can further include at least one condition source 24. The condition source 24 can be a device that generates the condition, removes the condition, obfuscates the condition, attenuates the condition, amplifies the condition, filters the condition, interferes with the condition, etc. The condition source 24 can be an RF emitter, electromagnetic radiation emitter, light emitting device, a laser, a light emitting diode ("LED"), a heat generator, a heat sink, an electric field generator, a magnetic field generator, an ultrasound generator, a vibrational device, ultraviolet ("UV") generator, infrared ("IR") generator, an acoustic generator, a filter, an amplifier, etc. In some embodiments, the condition source 24 can be part of the reader 20. In some embodiments, the condition source 24 can be separate from the reader 20. The condition source 24 may be in electrical communication with the processor 22. This may include being in wireless communication with the processor 22. The processor 22 can be programmed to cause the condition source 24 to activate and/or deactivate. There can be more than one condition source 24. Any one condition source 24 can be the same as or different from another condition source 24. Any one condition source 24 can be configured to generate more than one condition.

Figure 3:
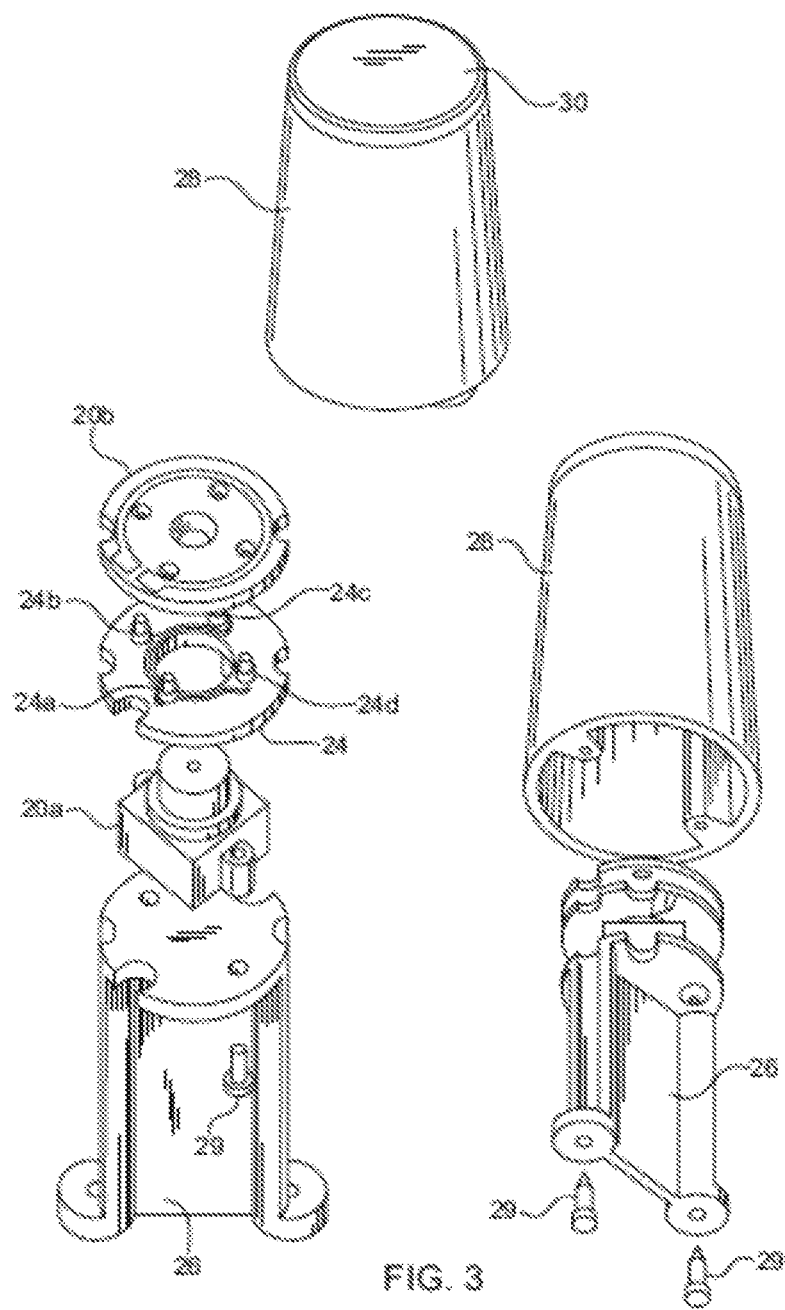
FIG. 3 is an embodiment of a reader and condition source that may be used with the system.

Referring to FIG. 3, some embodiments can include a combined reader 20 and condition source 24. FIG. 3 shows an exemplary configuration of a combined reader 20 and condition source 24. Some embodiments may include a base 26. At least one reader 20 may be placed on the base 26. This may include securing any one reader 20 to the base 26. FIG. 3 shows, as an example, an optical camera 20a and an RFID antenna 20b as two readers 20 being attached to the base 26. The optical camera 20a may be a wide angle camera, for example. The RFID antenna 20b may be an ultra-high frequency radio frequency antenna. At least one condition source 24 may also be placed on the base 26. This may include securing any one condition source 24 to the base 26. In addition, or in the alternative, any one of the readers 20 and/or condition sources 24 can be secured to another reader 20 and/or condition source 24. FIG. 3 shows, as an example, a printed circuit board ("PCB") as a condition source 24. The PCB can include at least one light emitter (e.g., LED). For example, the PCB can include a UV LED 24a (e.g., operating at or near 300 nm), a visible light LED 24b (e.g., operating at or near 500 nm), a first IR LED 24c (e.g., operating at or near 800 nm), and/or a second IR LED 24d (e.g., operating at or near 1100 nm).

At least one fastener 29 (e.g., a screw) may be used to secure any component to the base 26. The base 26 may be configured to be slidably received within a housing 28. The housing 28 may be secured to the base 26. This may be achieved via at least one fastener 29. The housing 28 may be configured to protect any component attached to the base 26. This may include covering and/or concealing the components. This may include protecting the components from being damaged from popcorn 16 or any of the additives to the popcorn 16, for example. The housing 28 may further include a window 30. The window 30 may include a lens. The window 30 can be configured facilitate passage of the condition (e.g., radiation, electromagnetic waves, heat, etc.) from the condition source 24 that may be attached to the base 26. The window 30 may also facilitate passage of any response to the condition from the marker 12 and/or detectable property of the marker 12.

The processor 22 may cause data to be the transmitted to the marker 12, the reader 20, and/or the condition source 24. The processor 22 can cause the system 10 to change the property of the marker 12. This may include re-programming the marker 12 (e.g., an RFID tag marker 12), causing the condition source 24 to generate a condition, etc. In some embodiments, the processor 22 may cause the marker 12 to "re-set". This may include re-setting the marker 12 for repeated used. The re-set may be used to cause the marker 12 to change back to its initial property or to a property that is different from the initial property. For example, a first condition source 24 can be configured to generate a first condition. The first condition can cause the marker 12 to change from a first property to a second property. The processor 22 can cause the first condition source 24 to generate a second condition and/or cause a second condition source 24 to generate the second condition. The second condition can cause the marker 12 to change from the second property back to the first property. This may be done to "re-set" the marker 12. As another example, the second condition can cause the marker 12 to change from the second property to a third property. The third property may be the "re-set" for the marker 12. Re-setting the marker 12 can include reprogramming the marker 12.

Figure 4:
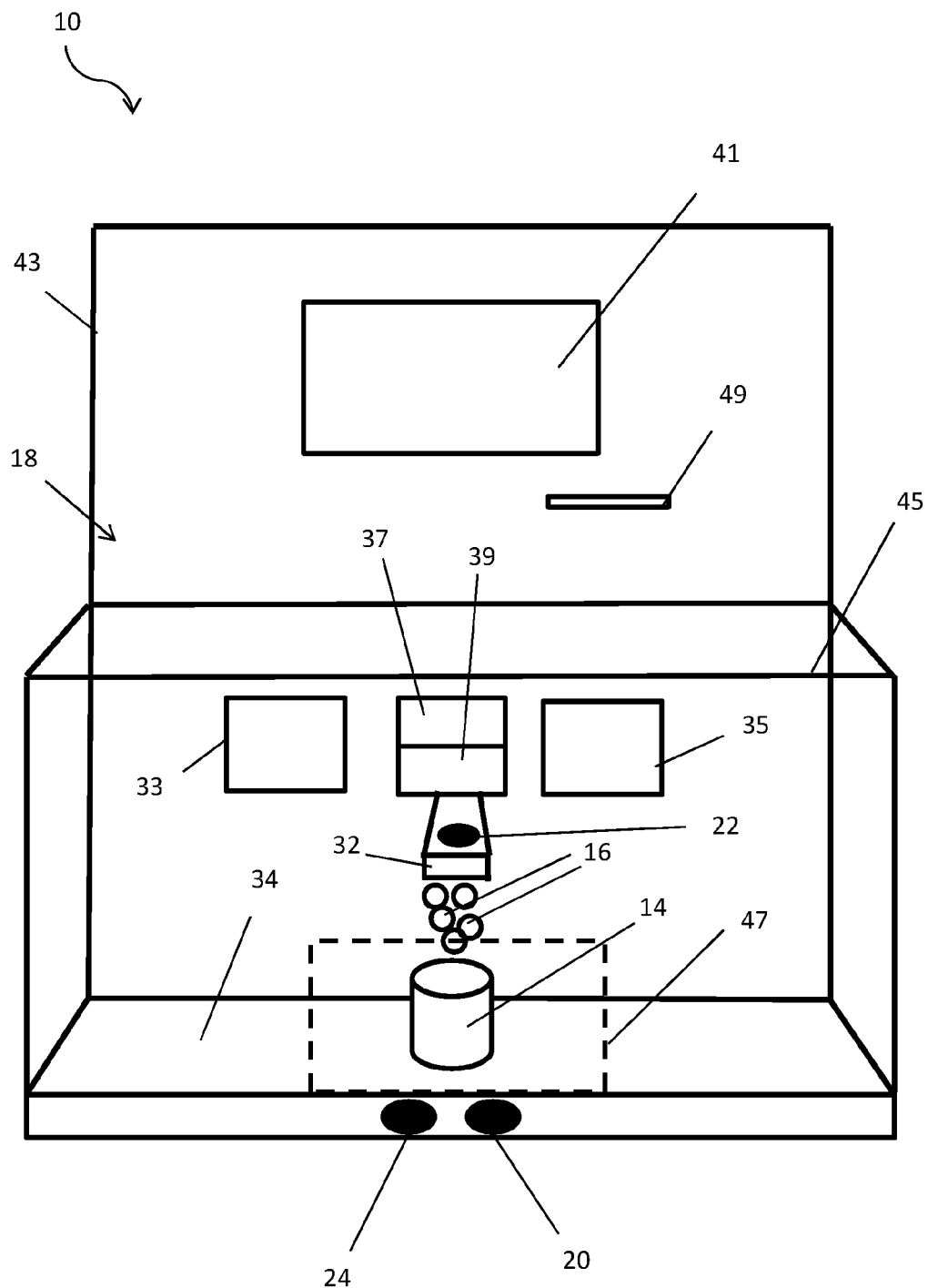
FIG. 4 is an embodiment of the system including a dispensing apparatus.

Referring to FIG. 4, the system 10 can include a dispensing apparatus 18. In some embodiments, the dispensing apparatus 18 may be part of the system 10. In some embodiments, the system 10 can be in electrical communication with the dispensing apparatus 18. This can include wireless communication. The dispensing apparatus 18 can be configured to dispense popcorn (e.g., the object 16) and/or at least one of the additives to the popcorn 16 into a popcorn container (e.g., the item 14). Some dispensing apparatuses 18 may include actuators in electro-mechanical communication with air pop feeds 32 to dispense popcorn therefrom. Some dispensing apparatuses 18 can include use of RFID writers, read-write RFID tags, RFID readers, display screens, sensors, and controllers, etc. Any or all of these components can be in communication with each other to effectuate automatic dispensement and tracking of popcorn and/or additives to the popcorn. Some dispensing apparatuses 18 can include methods and features for RFID encoding RFID tags. These RFID tags may be associated with the popcorn container and/or the dispensing apparatus 18. Information obtained from the read-write RFID tags may be used to facilitate coordinating dispensement of popcorn and/or additives to the popcorn.

Some dispensing apparatuses 18 may be configured to sense proximity of popcorn containers. This may be done to control functioning of air pop feeds 32 of the dispensing apparatus 18. Controlling the function may be done via a processor 22. The processor 22 may be in electrical communication with the dispensing apparatus 18. This may include being in wireless communication. Communications via the processor 22 may be used to authorize a fill (e.g., popcorn being dispensed into the popcorn container from the dispensing apparatus 18) and/or or refill a popcorn container.

Some dispensing apparatuses 18 can include features for tracking a quantity of popcorn dispensed and/or a quantity of popcorn and/or an additive to the popcorn remaining to be dispensed based on a purchased amount of popcorn and/or the additive. This can include a meter flow unit configured to monitor flow of popcorn and/or the additive to the popcorn.

The dispensing apparatus 18 may be configured to include a kernel storage compartment 33. The kernel storage compartment 33 can be a bin located within the dispensing apparatus 18. There can be more than one kernel storage compartment 33. For example, the dispensing apparatus 18 can include a first kernel storage compartment configured to store a first type of popcorn kernel. The dispensing apparatus 18 can include a second kernel storage compartment configured to store a second type of popcorn kernel. The first type of popcorn kernel may be the same as or different from the second type of popcorn kernel. The dispensing apparatus 18 may be configured to include an additive storage compartment 35. The additive storage compartment 35 can be a bin located within the dispensing apparatus 18. There can be more than one additive storage compartment 35. For example, the dispensing apparatus 18 can include a first additive storage compartment configured to store a first type of additive. The dispensing apparatus 18 can include a second additive storage compartment configured to store a second type of additive. The first type of additive may be the same as or different from the second type of additive. Any one or combination of kernel storage compartments 33 and/or additive storage compartments 35 can be in mechanical connection with the air pop feed 32.

Upon the system 100 receiving a command signal to dispense popcorn and/or additive, a predetermined amount of popcorn kernel can be transferred from at least one kernel storage compartment 33 to the air pop feed 32. The command signal can be sent from a control module 41 of the dispenser apparatus 18. Any one or combination of kernel types from the same or different kernel storage compartment 33 can be transferred to the air pop feed 32.

The air pop feed 32 can include a heating compartment 37. The air pop feed 32 can apply heat, microwave energy, or other form of energy to the heating compartment 37 to cause the kernels to transform into popped corn. In some embodiments, additive can be added to the kernels and/or popped corn within the heating compartment 37. In some embodiments, the heating compartment 37 can be configured as a rotating drum, a shaking drum, an oscillating drum, etc. The motion of the drum can facilitate agitation and/or mixing of kernels, popped corn, and/or additives.

In some embodiments, the popped corn can be held in a mixing compartment 39 before being dispensed from the air pop feed 32 and into the popcorn container 14. When in the mixing compartment 39, any one or combination of additives can be added to the popped corn. The addition of additives can be in accordance with command signals sent from the control module 41 of the dispenser apparatus 18. The mixing compartment 39 can be configured as a rotating drum, a shaking drum, an oscillating drum, etc. The motion of the drum can facilitate agitation and/or mixing of popped corn and/or additive.

In some embodiments, the dispensing apparatus 18 can omit the mixing compartment 39. In some embodiments, the dispensing apparatus 18 can be configured to selectively by-pass the mixing compartment 39. This can be achieved via use of conveyers, dampers, etc. In such embodiments, the popped corn can be dispensed from the air pop feed 32 without being mixed in the mixing compartment 39.

Popped corn being dispensed from the air pop feed 32 can be directed to a popcorn container 14. Before, during, and/or after the popcorn 16 enters the popcorn container 14, additive can be added to the container 14. This can be additive in addition to, or in the alternative to, the additive that may have been added before the popcorn was dispensed.

In some embodiments, the dispensing apparatus 18 can include a tray 34 with a housing 43. The tray 34 may extend out from the housing 43. The housing 43 can include the air pop feed 32, various compartments 33, 35, and other equipment necessary to effectuate storage and dispensement of kernels, additives, popped corn, and other mechanical and computer equipment. In some embodiments, a display casing 45 can extend from the housing 43. In some embodiments, the display casing 45 may further extend over at least a portion of the tray 34. The display casing 45 can include an opening 47. The opening 47 can facilitate ingress and egress to and from the tray 34 and/or air pop feed 32. The opening 47 may allow a user to insert the popcorn container 14. This may include placing the popcorn container 14 underneath the air pop feed 32. A user may also use the opening 47 to remove the popcorn container 14 from underneath the air pop feed 32. In some embodiments, at least a portion of the display casing 45 can be transparent and/or translucent. This may allow a user to observe the popcorn being produced and/or dispensed.

In some embodiments, the dispensing apparatus 18 can include a payment device 49. The payment device 49 can include a currency receptacle, a credit card swipe, or similar unit. The payment device 49 can be in electrical communication with the processor 22. The processor 22 may be in electrical communication (e.g., wireless communication) with a payment network to facilitate financial transactions. A user may use the payment device 49 to purchase an amount of popcorn and/or additive.

In some embodiments, the dispensing apparatus 18 can include a control module 41. The control module 41 can be configured as a touchscreen display. For example, the processor 22 can be programmed to cause the touchscreen 41 to display a user interface. The user interface can be used by a user to cause the dispensing apparatus 18 to prepare and dispense popcorn. In some embodiments, the touchscreen 41 can allow a user to select any one or any combination of kernels of popcorn, an amount of popcorn to be dispensed, and/or any one or combination of additives to add to the popcorn. The touchscreen 41 can further allow a user to select amounts of popcorn and/or additives for purchase before they are selected for dispensement.

In at least one embodiment, the system 10 may be used in the following manner. A user may purchase an amount of popcorn 16 and/or additive. This amount may allow at least one fill and/or at least one partial fill of the popcorn container 14 from the dispensing apparatus 18. A user may insert the popcorn container 14 through the opening 47. This may include placing the popcorn container 14 underneath at least one air pop feed 32. A user may select from the touchscreen 41 a type and/or amount of kernel and/or additive, or a combination of kernels and additives, to generate a serving. The dispensing apparatus 18 can then transfer the selected kernels and/or additives from the compartments 33, 35 to the air pop feed 32. The kernels can be transferred to the heating compartment 37. In some embodiments, at least one additive can be transferred to the heating compartment 37. The kernels and/or additives can be heated so that the kernels transform into popped corn. The heating compartment may be motioned to facilitate agitation and/or mixing of the kernels, popped corn, and/or additives. The popped corn can then be transferred to a mixing compartment 39, caused to by-pass the mixing compartment 39, and/or dispensed from the air pop feed 32. If transferred to the mixing compartment 39, additive or additional additive can be added to the popped corn. The mixing compartment 39 can be motioned to facilitate agitation and/or mixing of the popped corn and/or additive. The popped corn can then be dispensed from the air pop feed 22.

Dispensing popped corn from the air pop feed 32 can be performed so that a predetermined amount of popped corn is dispensed. The predetermined amount can depend on the volume of the popcorn container 14, the amount of popcorn 16 and/or additive paid for by a user, the amount of calorie content of the popcorn 16 and/or additive to be dispensed, the amount of sugar and/or salt content of the popcorn 16 and/or additive to be dispensed, etc. The predetermined amount can also be limited by the amount of kernel transferred from the kernel storage compartment 33. For example, the amount of popcorn to be dispensed can be determined by the amount of kernels to be popped into popcorn. Thus, little to no extra popcorn is made foe a selected serving. A user can then remove the popcorn container 14 from the dispensing apparatus 18. This can include removing the popcorn container 14 from the opening 47. Any of the readers 20, condition sources 24, and/or processors 22 can be part of the dispensing apparatus 18. In some embodiments, any of the readers 20, condition sources 24, and/or processors 22 may be separate from the dispensing apparatus 18 but be in electrical communication with the dispensing apparatus 18. This can include being in wireless communication. In some embodiments, the processor 22 can be configured to manage readers 20 and/or control condition sources 24 that may be included with the dispensing apparatus 18. In some embodiments, the processor 22 can be configured to allow a single Universal Serial Bus to interface with the processor 22.

In at least one embodiment, the dispensing apparatus 18 can include at least one air pop feed 32. The air pop feed 32 may be configured to dispense a predetermined amount of popcorn 16 and/or additive. The predetermined amount can depend on the volume of the popcorn container 14, the amount of popcorn 16 and/or additive paid for by a user, the amount of calorie content of the popcorn 16 and/or additive to be dispensed, the amount of sugar and/or salt content of the popcorn 16 and/or additive to be dispensed, etc. For example, it is contemplated for a user to purchase a certain amount of popcorn 16 and/or additive. The predetermined amount may be recorded by a processor 22 of the system 10. A user can be given a popcorn container 14 upon purchasing the popcorn 16 and/or additive amount. The popcorn container 14 can be associated with a marker 12. The marker 12 and the amount of popcorn 16 and/or additive purchased can be associated with each other. The marker information and the amount purchased information can be stored in the processor 22. The dispensing apparatus 18 can be configured to require the user to cause the marker 12 to be in readable-sight of the reader 20 before the dispensing apparatus 18 dispenses the popcorn 16. For example, the reader 20 may be in a tray 34 located below the air pop feed 32. The marker 12 may be placed on a bottom of the popcorn container 14, for example.

When a popcorn container 14 is placed underneath the air pop feed 32, the marker 12 can then be in readable-sight of the reader 20. Upon reading and/or not reading the marker 12, the dispensing apparatus 18 can determine if popcorn 16 and/or additive should be dispensed, how much popcorn 16 and/or additive to dispense, which type of popcorn 16 and/or additive to dispense, etc.

The processor 22 may be programmed to permit or prevent dispensement of popcorn and/or additive 16 into the popcorn container 14 and/or into a different popcorn container 14. Before, during, and/or after reading the marker 12 information and/or dispensing the popcorn 16 and/or additive, any one or a combination of the following may occur:

1. tracking information (e.g., the marker 12 information, the popcorn container 14 information, and/or the popcorn 16 information) can be processed and/or stored by the processor 22;
2. tracking information can be transmitted from the processor 22 to the computer device;
3. the marker 12 can be modified.

For example, before, during, and/or after reading the marker 12 information and/or dispensing the popcorn 16 and/or additive, the processor 22 can cause the condition source 24 to activate and/or de-activate. This may cause a property of the marker 12 to modify. The modification in marker 12 property can result in a change in marker 12 information that may be read by a reader 20. Before, during, and/or after reading the marker 12 information and/or dispensing the popcorn 16 and/or additive, the marker 12 information, the popcorn container 14 information, and/or the popcorn 16 and/or additive information can be updated. This can include, any changes in marker information, the amount and/or type of popcorn 16 and/or additive dispensed, the amount and/or type of popcorn 16 and/or additive dispensed relative to the amount and/or type of popcorn 16 and/or additive purchased, the popcorn container 14 used for reading, the popcorn container 14 used to receive the popcorn 16 and/or additive, the number of times the popcorn container 14 has been used, the number of fills and/or refills that has occurred for the popcorn container 14, the time, date, and/or location of dispensement of popcorn 16 and/or additive, the amount of calorie content of the popcorn 16 and/or additive dispensed into the popcorn container 14 during any one dispensement, the running total amount of calorie content of the popcorn 16 and/or additive dispensed into the popcorn container 14, the dispensing apparatus 18 used for dispensement, and/or other statistical information related to the marker 12, the popcorn container 14, the popcorn 16 and/or additive.

In some embodiments, the system 10 can utilize programming code and/or algorithms to establish a set of rules for controlling how much, when, where, and which type popcorn 16 and/or additive, etc. can be dispensed into the popcorn container 14. The set of rules can also control proxy values associated with the popcorn 16 and/or additive. For example, the set of rules can control the dispensement of popcorn 16 and/or additive based on the calories to be consumed by ingesting the popcorn 16, the salt to be consumed by ingesting the popcorn 16 and/or additive, the sugar to be consumed by ingesting the popcorn 16 and/or additive, etc. Other proxy values can be used.

In some embodiments, the processor 22 can cause the condition source 24 to modify the marker 12 each time the marker 12 is read, each time a dispensement is made, and/or based on some other parameter or event (e.g., during a concert, during a free refill time period, etc.). For example, the marker 12 may not be modified unless the popcorn container 14 is being used (or was used) as a refill, or is being used (or was used) as a second refill, or a third refill, etc. The marker 12 may not be modified unless a certain type of kernel is being (or has been) used and/or a certain type of popcorn 16 and/or additive is being dispensed (or was dispensed). The marker 12 may not be modified unless a certain dispensing apparatus 18 and/or a certain air pop feed 32 is being used (or was used). The marker 12 may not be modified unless it is a certain day of the week, time of day, etc.

Embodiments of the present invention can allow for accurate tracking of popcorn and/or additive usage. Embodiments can further allow for producing popcorn on an 'on-demand" basis. For example, some embodiments can configure the dispensing machine 18 such that kernels are not popped and/or dispensed until a customer causes the dispensing. This can facilitate production of fresh popped corn for each serving. As noted above, little to no excess popcorn is produced for each serving. This can further obviate the possibility of dispensing stale popped corn to customers. Embodiments of the present invention can further reduce waste by not generating batches of popped corn that may not be used. An additional advantage can be permitting users to customize their order, allowing them to generate a type of popped corn with the additives they desire. A user can further customize their order by limiting the amount of calories, salt, sugar, etc. that may consume. Further advantages can include allowing dispenser apparatus 18 administrators to track popcorn and additive usage, purchase trends, price elasticity, etc. The inventive system can further allow dispenser apparatus 18 administrators to more effectively manage supply chain and inventory. Further advantages can include reduction of long lines at concession points used to sell and/or dispense popcorn.

In some embodiments, marker 12 associated with the popcorn container 14 can include the size and/or capacity of the popcorn container 14. When the marker 12 is read by the reader 20, the processor 22 can use the information to determine the maximum amount to dispense into the popcorn container 14. Thus, regardless of the selected amount by the user, the system 100 may draw the amount of kernels from the kernel storage compartment 33 that would not exceed the maximum capacity of the popcorn container 14 after the kernel has been transformed into popcorn. Thus, the system 100 can set an upper limit of popcorn to produce for a serving, regardless of the amount selected, based on the capacity of the popcorn container 14. This may prevent over-filling and/or spillage.

In some embodiments, the processor 22 can be programmed to record and track selections and choices made by a user. This can include recording and tracking the amount and type of kernels selected, the amount and type of additives selected, etc. The processor 22 may then use any one or combination of the previously selected amounts and/or types of kernels and/or additives as a default setting for the user. The default setting can be the most recently selected amounts and/or types of kernels and/or additives, the most healthy amounts and/or types of kernels and/or additives, the most profitable amounts and/or types of kernels and/or additives, etc.

In some embodiments, the dispensing apparatus can be configured with modular parts to facilitate ease of disassembly during cleaning and/or maintenance operations. This can minimize downtime. In some embodiments, the processor 22 can be programmed to set predetermined cleaning and/or maintenance times. During these times, the dispensing apparatus 18 can be automatically shut down or otherwise made unavailable until the schedule cleaning and/or maintenance is performed. Some embodiments can provide notification when certain types of kernels and/or additives are low in supply and/or out of stock, when scheduled cleaning and/or maintenance is about to occur, and/or when the dispensing apparatus 18 has been made unavailable due to a scheduled cleaning and/or maintenance. The notification(s) can be displayed on the control module 41 and/or transmitted to an administrator computer device via the processor 22. Transmitted notifications to an administrator computer device can be achieved by the processor 22 being in electrical communication (e.g., wireless communication) with the administrator computer.

EXAMPLES

Figure 5:
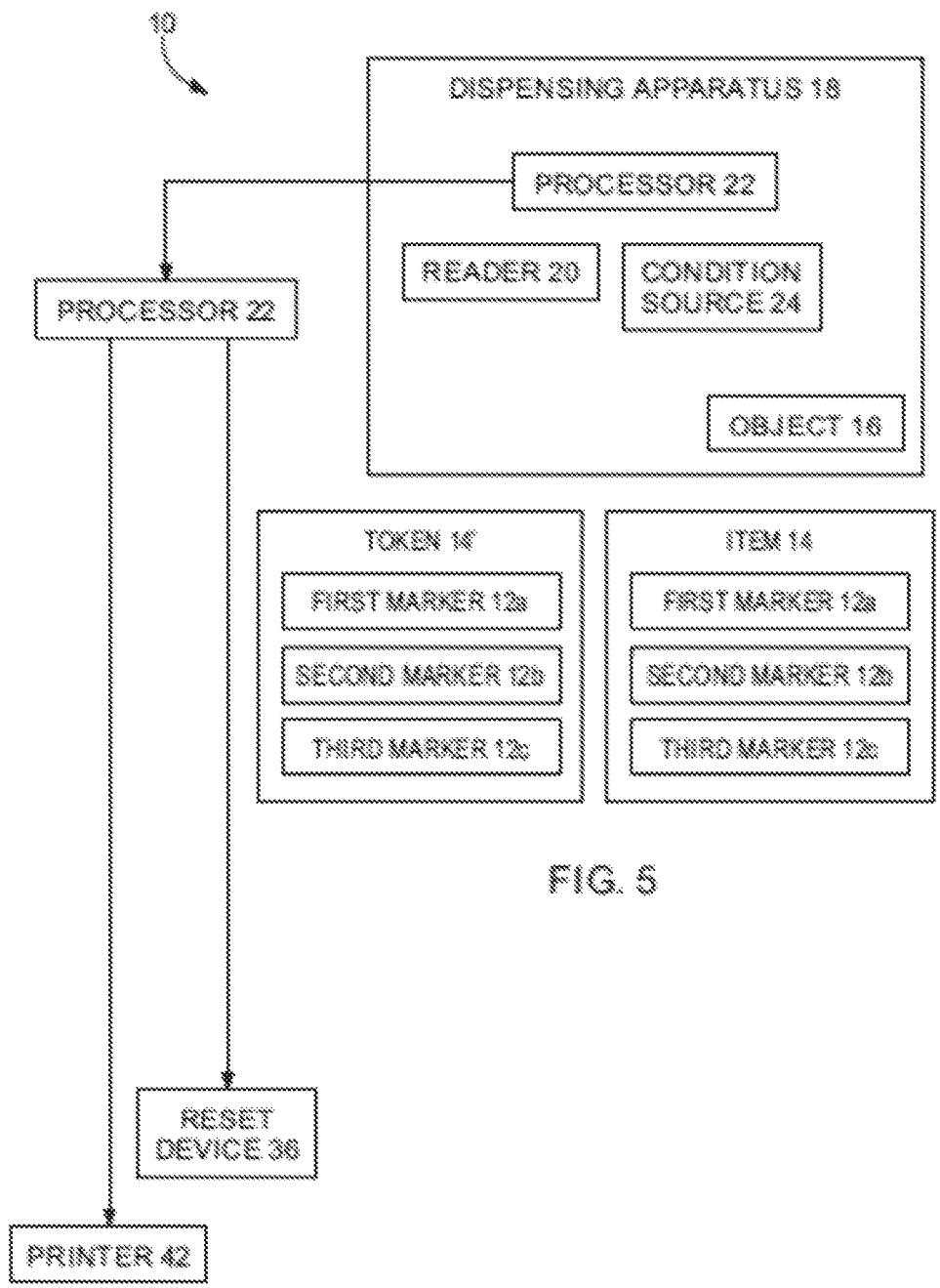
FIG. 5 is an exemplary block diagram of an embodiment of the system.
Figure 6:
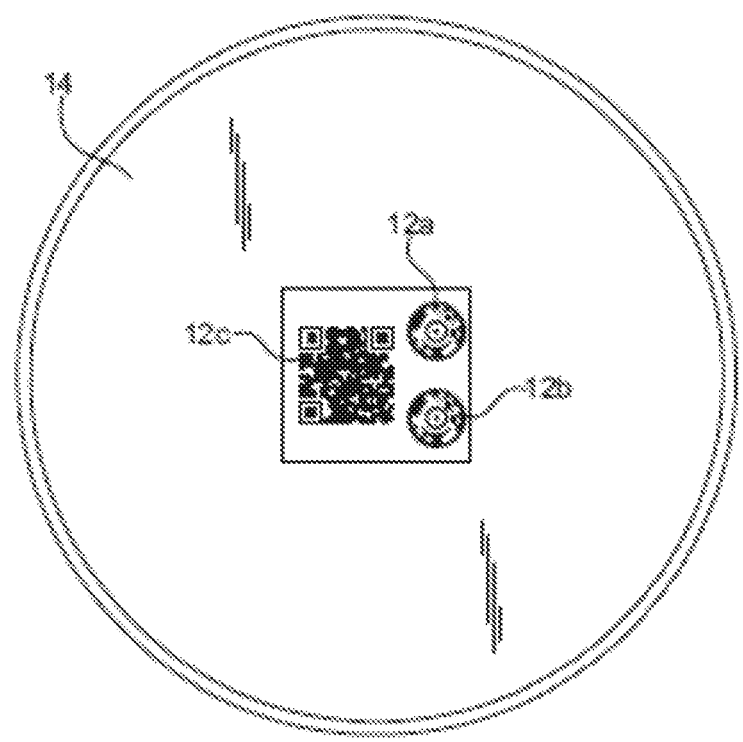
FIG. 6 is an embodiment of a popcorn container with a plurality of markers associated therewith.

Referring to FIGS. 5-6, at least one embodiment can include a plurality of markers 12. Any one of the markers 12 can be a modifiable marker 12. Any one of the markers 12 can be the same as or different from any one of the other markers 12. For example, a first marker 12 and a second marker 12 may be associated with the popcorn container 14. The first marker 12 may be a modifiable marker. The second marker 12 may be a non-modifiable marker. The first marker 12 may be used to track certain information about popcorn 16 and/or additive and/or use of the popcorn container 14. The second marker 12 may be used to track information regarding the popcorn container 14. For example, the first marker 12 may be ink. The ink may be printed on a portion of the popcorn container 14. The ink can be modifiable ink that is modified upon exposure and/or removal from exposure of electromagnetic radiation. For example, the ink can be UV modifiable, IR modifiable, etc. For instance, a condition source 24 can expose the ink to UV light. Upon exposure of the UV light, the ink may become more transparent, absorbent, change color, etc. In some embodiments, the ink can be a mixture of different electromagnetic radiation condition-setting inks. For example, the ink can be a mixture of UV ink and IR ink. The second marker 12 can be a barcode. The barcode may be placed on or in a portion of the popcorn container 14. This can include being printed on a surface (e.g., bottom, side, lip, etc.) of the popcorn container 14. The barcode may be written in normal (e.g., non-modifiable) ink. The barcode can include information related to an attribute or characteristic of the popcorn container 14 (e.g., popcorn container size, serial number, etc.), the popcorn 16 and/or additive to be dispensed in the popcorn container 14, the company providing the popcorn 16 and/or additive service, the type of popcorn 16 and/or additive service, a location of the dispensing apparatus 18, a time that elapses between dispensements of popcorn 16 and.or additives, the number of dispensements that remain, loyalty program information, marketing information, other identifying information, etc. The barcode can include, but not limited to, Quick Response (QR) codes, matrix barcodes, Maxicodes, high capacity color barcodes, data matrices, CrontoSigns, Aztec Codes, and/or other two-dimensional barcodes, etc. Any of the first and/or second ink marks may also include a pattern.

In some embodiments, the time that elapses between dispensements of popcorn 16 and/or additives can be used to prevent gaming. For example, it is contemplated for at least one embodiment of the system 10 to be used to offer at least one popcorn refill program. A popcorn refill program can be set up such that a user purchases a predetermined amount of popcorn 16 and/or additive. This predetermined amount can be valid for a certain period of time. This can include a few hours, all day, all year, etc. Thus, a user may have one day to obtain as many refills as desired before the predetermined amount has been reached and/or before the day ends. In another embodiment, a refill program can be set up such that a user purchases a predetermined refill time amount. The predetermined refill time amount can be a few hours, one day, etc. Thus, a user may have one day to obtain as many refills as desired before the predetermined refill time expires. The system 10 may be configured to wait a predetermined time-lapse time before a subsequent fill can be obtained from a preceding fill. This can be done to reduce the ability of users to game the system 10 by obtaining refills and sharing them with others who did not purchased the predetermined refill time amount. For example, a user who purchases a predetermined refill time amount may be subjected to a 20 minute time-lapse time, which would require the user to wait 20 minutes between refills.

As shown in FIGS. 5-6, as another example, the popcorn container 14 can be associated with a first marker 12*a*, a second marker 12*b*, and a third marker 12*c*. The first marker 12*a* and the second marker 12*b* may be used to track certain information about the popcorn 16 and/or additive and/or use of the popcorn container 14. The third marker 12*c* may be used to track information regarding the popcorn container 14. The first marker 12*a* may be a first ink mark. The first ink mark may be printed on a portion of the popcorn container 14. The first ink mark may include ink that becomes transparent when exposed to a first wavelength of light, but is otherwise opaque or translucent. This may include IR or near-IR electromagnetic radiation (e.g., light at or near 800 nm). The second marker 12*b* may be a second ink mark. The second ink mark may be printed on a portion of the popcorn container 14. The second ink mark may include ink that becomes transparent when exposed to a second wavelength of light, but is otherwise opaque or translucent. This may include UV electromagnetic radiation (e.g., light at or near 300 nm). In some embodiments, the first ink mark can be configured to remain opaque or translucent when exposed to UV electromagnetic radiation, including UV radiation at or near 300 nm.

In some embodiments, the second ink mark can be configured to remain opaque or translucent when exposed to IR or near-IR radiation, including IR or near-IR radiation at or near 800 nm. The third marker 12*c* can be a barcode. The barcode may be placed on or in a portion of the popcorn container 14. This can include being printed on a surface of the popcorn container 14. The barcode can include information related to an attribute or characteristic of the popcorn container 14 (e.g., popcorn container size, serial number, etc.), the popcorn 16 and/or additive to be dispensed in the popcorn container 14, the company providing the popcorn 16 and/or additive service, the type of popcorn 16 and/or additive service, a location of the dispensing apparatus 18, a time that elapses between dispensements of popcorn 16 and/or additive, the number of dispensements that remain, loyalty program information, marketing information, other identifying information, etc. The barcode may be written in normal (e.g., non-modifiable) ink. The barcode ink can be translucent or opaque. In some embodiments, the third marker 12*c* can be a non-modifiable mark.

The first ink mark may be used to indicate whether the fill (e.g., the popcorn 16 and/or additive being dispensed into the popcorn container 14 from the dispensing apparatus 18) on the popcorn container 14 is the first fill. The first fill may be the first time the dispensing apparatus 18 dispenses popcorn 16 and/or additive into the popcorn container 14, the first time the dispensing apparatus 18 dispenses a certain type of popcorn 16 and/or additive into the popcorn container 14, the first time the dispensing apparatus 18 dispenses popcorn 16 and/or additive into the popcorn container 14 after the popcorn 16 and/or additive had been paid for, the first time the dispensing apparatus 18 dispenses popcorn 16 and/or additive into the popcorn container 14 at a certain location, the first time the dispensing apparatus 18 dispenses popcorn 16 and/or additive into the popcorn container 14 on a certain day, etc. For example, the popcorn container 14 may be placed within readable-sight of the reader 20. If the first mark is readable, then the system 10 can determine that it is the first fill on the popcorn container 14.

Upon dispensing popcorn 16 and/or additive, the system 10 may cause the condition source 24 to emit IR light to cause the first ink mark to become transparent or otherwise unreadable by the reader 20. Alternatively, the first fill may be defined by a certain amount of popcorn 16 and/or additive. Thus, the system 10 may not cause the condition source 24 to modify the first mark until a certain amount of popcorn 16 and/or additive has been dispensed, regardless of the number of times the dispensing apparatus 18 dispensed popcorn 16 and/or additive into the popcorn container 14. Other parameters can be used to define the first fill. These can include the amount of salt content, the amount of calorie content, the amount of sugar content, etc.

The second ink mark may be used to indicate whether the fill on the popcorn container 14 is a second fill. The second fill may be the second time the dispensing apparatus 18 dispenses popcorn 16 and/or additive into the popcorn container 14, the second time the dispensing apparatus 18 dispenses a certain type of popcorn 16 and/or additive into the popcorn container 14, the first time the dispensing apparatus 18 dispenses popcorn 16 and/or additive into the popcorn container 14 after the first fill of popcorn 16 and/or additive had been paid for, the second time the dispensing apparatus 18 dispenses popcorn 16 and/or additive into the popcorn container 14 at a certain location, the second time the dispensing apparatus 18 dispenses popcorn 16 and/or additive into the popcorn container 14 on a certain day, etc. For example, the popcorn container 14 may be placed within readable-sight of the reader 20. If the first mark is unreadable but the second mark is readable, then the system 10 may determine that the fill attempted is the second fill.

Upon dispensing popcorn 16 and/or additive, the system 10 may cause the condition source 24 to emit UV light to cause the second ink mark to become transparent or otherwise unreadable by the reader 20. Alternatively, the second fill may be defined by a certain amount of popcorn 16 and/or additive. Thus, the system 10 may not cause the condition source 24 to modify the second mark until a certain amount of popcorn 16 and/or additive has been dispensed, regardless of the number of times the dispensing apparatus 18 dispensed popcorn 16 and/or additive into the popcorn container 14. Other parameters can be used to define the second fill. These can include the amount of salt content, the amount of calorie content, the amount of sugar content, etc.

The combination of the first in mark and the second ink mark may be used to indicate whether the fill on the popcorn container 14 is a third fill. The third fill may be defined by an attempted fill that has not been paid for or otherwise not permitted (e.g., exceeding the number of calorie intake, exceeding the amount of salt content, etc.). For example, the popcorn container 14 may be placed within readable-sight of the reader 20. If the first mark and the second are both unreadable then the system 10 may determine that the fill attempted is the third fill. The processor 22 may then prevent any one or any combination of air pop feeds 32 from dispensing popcorn 16.

Figure 7A:
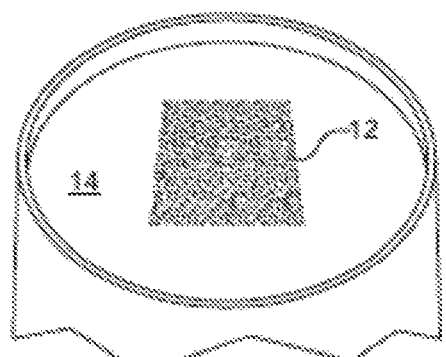
FIGS. 7A-7D are embodiments of a popcorn container with a disappearing marker, a film marker, a written code marker, and a magnetic marker, respectively, that may be used with the system. Note that some embodiments can use thermal and/or ink that is invisible to the naked eye.
Figure 7B:
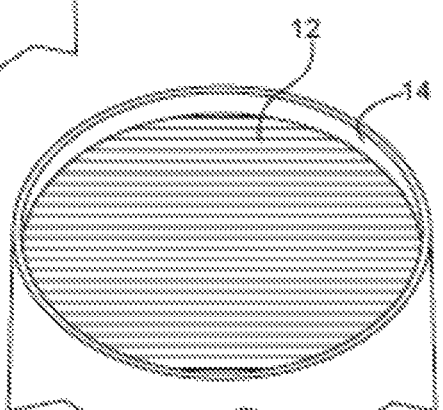
Figure 7C:
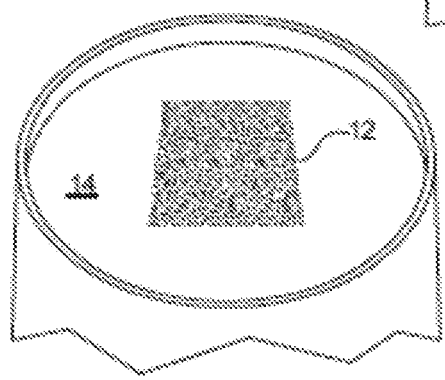
Figure 7D:
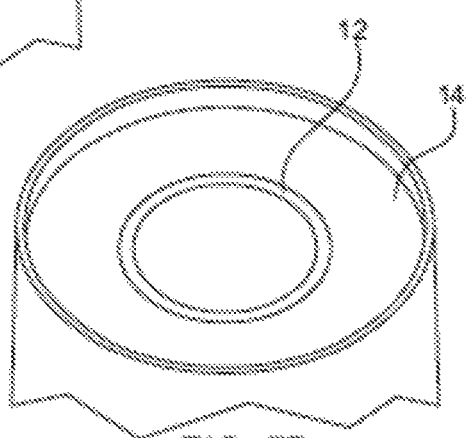

Referring to FIGS. 7A-7D, embodiments of the system can include different types of markers 12. Each of FIGS. 7A-7D show a marker 12 placed on a bottom surface of a popcorn container 14; however, the markers 12 can be placed on any surface or portion of the popcorn container 14. FIG. 7A shows a marker 12 that can be configured to disappear upon being subject to the condition. FIG. 7B shows a marker 12 that can be configured as a film attached to a surface of the popcorn container 14. Using a film as a marker 12 may eliminate the need to index paper stock that may be used during the manufacturing process of the popcorn container 14. For example, the popcorn container 14, or at least a portion of it, may be fabricated from paper. If the marker 12 is printed or embossed on the popcorn container 14, the manufacturing process may require indexing the paper stock. Thus, use of a film may prevent the need for additional equipment to be installed on existing process lines. This may facilitate keeping the cost of marker 12 application low. FIG. 7C shows a marker 12 that may be configured to embody a written code. FIG. 7D shows a marker 12 that may be configured as a magnetic strip material.

In at least one embodiment, a popcorn container 14 may be associated with one marker 12. The marker 12 can be made with different compositions and/or with different thicknesses that can determine the rate at which the marker 12 changes. This is may be beneficial when attempting to control volume. For example, a 32-ounce popcorn container 14 may include a marker 12 that when activated disappears (or otherwise becomes unreadable) within 8 seconds. A 16-ounce popcorn container 14 may include a marker 12 that when activated disappears (or otherwise becomes unreadable) within 4 seconds. This dispensement of popcorn 16 and/or additive may flow from the dispensing apparatus 18 at a rate of 4 ounces per second. Thus, the processor 22 may be programmed to allow the dispensing apparatus 18 to dispense popcorn when the marker 12 is within the readable-sight of the reader 20 and the reader 20 detects the marker 12. The dispensement of popcorn 16 and/or additive may occur upon activation of a air pop feed 32. The dispensement of popcorn 16 and/or additive may stop after the marker 12 is no longer readable, even though the marker 12 is still within the readable-sight of the reader 20 and/or regardless of the air pop feed 32 being activated.

Referring FIGS. 5 and 8-9B, a user may purchase another fill or purchase another plurality of fills. For example, a user may do this after a user exhausts the number of allowable fills. After purchasing another fill or plurality of fills, the popcorn container 14 may be placed into a reset device 36. The reset device 36 may include at least one condition source 24. The reset device 36 can activate the at least one condition source 24 to cause the first and second marks to modify and become opaque or otherwise readable by the reader 20 (i.e., the marks can become re-set). The reset device 36 may be in electrical communication with the processor 22. This can include being in wireless communication.

In some embodiments, the reset device 36 can be part of a dishwasher. In some embodiments, the reset device 36 can be in electrical communication with the dishwasher. This can include being in wireless communication. The dishwasher can be an automatic dishwasher machine. During a reset phase, a user may deposit the popcorn container 14 into a popcorn container receptacle 38. For example, the popcorn container 14 may be placed within an inlet 40a of the popcorn container receptacle 38. The popcorn containers 14 within the popcorn container receptacle 38 may then be transported to the dishwasher for cleaning. Alternatively, the popcorn container 14 may exit the popcorn container receptacle 38 via an outlet 40b. Any of the inlets 40a and/or outlets 40b can be configured as a chute. The outlet 40b may direct the popcorn container 14 into the dishwasher. The dishwasher can include a wash cycle, a sanitize cycle, and/or a rinse cycle. As the popcorn container 14 is passed through the dishwasher, the condition source 24 can be activated. This may cause at least one of the markers 12 to re-set. As the popcorn container 14 exits the dishwasher, the popcorn container 14 and its markers 12 can be ready for continued use.

In some embodiments, the dishwasher may have a queue capability that allows it to handle fluctuations in popcorn container 14 dishwashing through-put volume. Some embodiments can include a customizable number of input and output locations and/or streams. For example, one input stream and/or output stream may be configured for low volume dishwashing (e.g., a low rate of washing popcorn containers 14 and/or a low rate of running the popcorn containers 14 through the dishwashing machine). Other input and or output streams may be configured for higher volume of dishwashing. Some embodiments can include more than one input and/or output stream.

Figure 8:
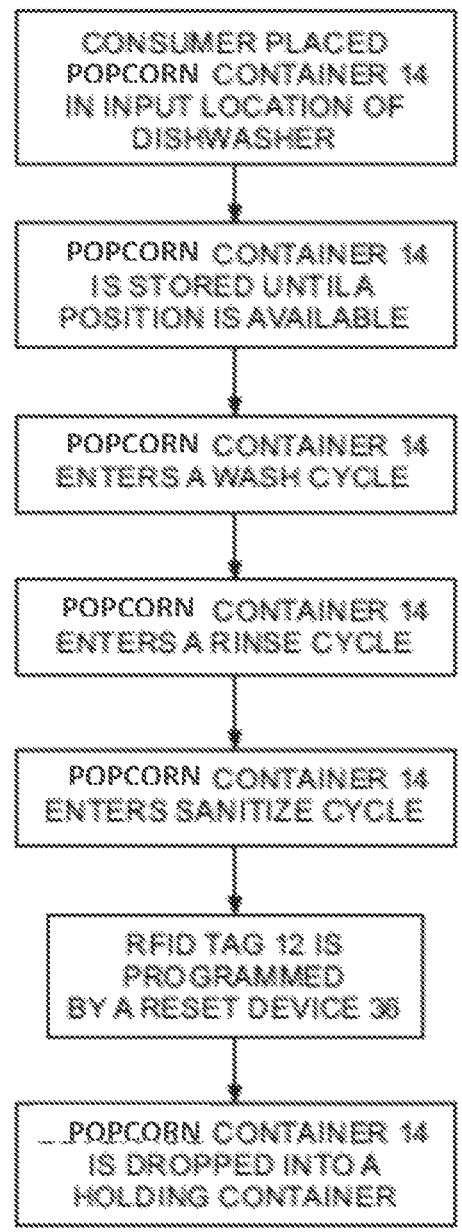
FIG. 8 shows an exemplary process flow that may be used for carrying out an embodiment having a reset device.

FIG. 8 shows an exemplary process flow that may be used for carrying out an embodiment of the reset device 36 configured as a dishwasher. A use may place a popcorn container 14 in an input location of a dishwasher. The popcorn container 14 may be stored or held in place until a position in the dishwashing queue is available. Once available, the popcorn container 14 may be caused to enter an input stream. Once in the input stream, the popcorn container 14 may enter a wash cycle. The popcorn container 14 may further enter a rinse cycle. The popcorn container 14 may further enter a sanitization cycle. The popcorn container 14 may further pass by at least one condition source 24 of a reset device 36. FIG. 8 shows a marker 12 being configured as an RFID tag and the RFID tag being reprogrammed by the reset device 36. Thus, the reprogramming of the RFID tag marker 12 can be the re-set action. The popcorn container 14 may be caused to exit the dishwasher. This may include being placed into a holding container. The process steps outlines above are exemplary. Other process steps and orders of the process steps can be used. For example, there can be more or less rinse cycles, sanitization cycles, etc. Any of the cycles can be omitted and/or switched in position. Any of the process steps can occur multiple of times.

Other combinations of markers 12, sensing schemes, and/or permutations of recording fills/refills can be used. For example, in addition to or in alternative to, the popcorn container 14 being associated with a marker 12, a card, a bracelet, a pendant, or some other token 14' may be associated with a marker 12. (See FIG. 5). For instance, the token 14' can be associated with a first marker 12. The first marker 12 can be an RFID tag. The RFID tag may be attached to or embedded within a portion of the token 14'. The popcorn container 14 can be associated with a second marker 12. The second marker 12 can be modifiable ink. The modifiable ink may be printed on a portion of the popcorn container 14. The second marker 12 can be thermal ink that is modifiable by a change in heat energy. The RFID tag may be a read-write RFID tag. The RFID tag may be programmed to include information about the popcorn container 14, the user of the popcorn container, popcorn and/or additive purchase information (e.g., number of fills or refills purchased, amount of popcorn and/or additive purchased, etc.), the type of popcorn service, the company offering the popcorn and/or additive service, etc. The second marker 12 can include information about usage of the popcorn container 14.

The popcorn container 14 may be placed within readable-sight of the reader 20. If the second mark is readable, then the system 10 can determine that it is the first fill on the popcorn container 14. If the second mark is not readable, then the system 10 can determine that a second fill is being attempted. The system 10 may be configured to allow a first fill but to prevent a second fill. If it is determined that it is a first fill that is being performed on the popcorn container 14 and a user places the token 14' within readable-sight of the reader 20, the reader 20 may then acquisition information from the RFID tag. In addition, or in the alternative, the processor 22 can transmit information to the RFID tag to update the RFID tag with statistics of the use/consumption of the popcorn 16 additive, and/or popcorn container 14. This information may be transmitted to another processor 22 of the system 10. Other combinations of markers 12, tokens 14', sensing schemes, and/or permutations of recording can be used with embodiments that include the token 14'. For example, there can be more than one marker 12 for the token 14', more than one marker 12 for the popcorn container 14, more than one property change for each marker 12, etc. Furthermore, the token 14' can include any of the markers 12 disclosed herein, and is thus not limited to use of an RFID tag.

Some embodiments may include a printer 42. The printer 42 can be part of the system 10. The printer 42 may be separate from the system 10 but be in electrical communication with the system 10. This can include wireless communication. For example, a printer 42 may be located at a point of sale ("POS") where a user may purchase the amount of popcorn 16 and/or additive. The printer 42 can be configured to associate a marker 12 with an item 14, 14'. With some embodiments, upon purchasing the amount of popcorn 16 and/or additive, the printer 42 can be used to associate the marker 12 with the popcorn container 14 and/or token 14'. For example, the printer 42 may be able to write a marker 12 in the form of a code onto the popcorn container 14 and/or token 14', apply a film to the popcorn container 14 and/or token 14', print ink on the popcorn container 14 and/or token 14', etc. During use of the popcorn container 14 and/or token 14' with the dispensing apparatus 18, the marker 12 can be placed within readable-sight of the reader 20. The code within the marker 12 may be deciphered by the processor 22. The code may contain a date stamp, a time stamp, the size of the popcorn cup, the number of fills and/or refills purchased, the time between fills and/or refills, etc.

In some embodiments, a reset device 36 may be used at the POS. The reset device 36 at the POS can be used to re-set the item 14, 14'.

Some embodiments can be configured to allow fills and/or refills during certain events. The events can include, but are not limited to, a concert, a happy hour, a free fill and/or refill hour, etc. The free refill hour, for example, can be for a specific hour for all users. Alternatively, or in addition, the free refill hour can be for an hour applied to each individual user. For example, the information obtained from the marker 12 can provide a time for which the first fill occurred for that particular user. The user may then have one hour to receive a predetermined amount of fills and/or refills from that first fill, which may be free. The same may be applied to another user. The first fill time for one user may be the same as or may be different from the first fill time for a second user. Thus, while each user may receive a free refill hour, the begin and end times for the one-hour time period for each may be different.

Figure 11A:
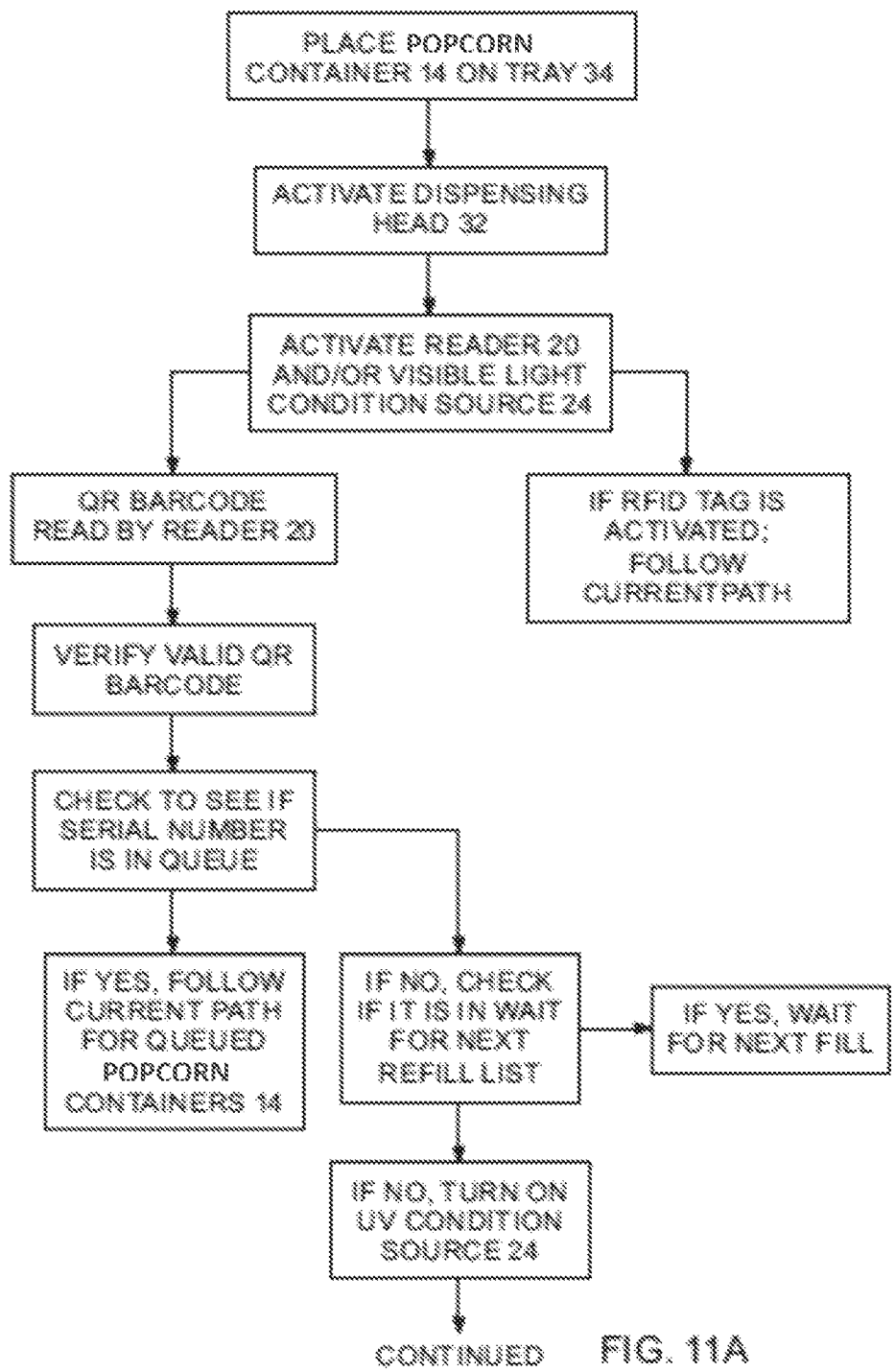
FIGS. 11A-11B show an exemplary process flow that may be used for carrying out an embodiment of the inventive method.
Figure 11B:
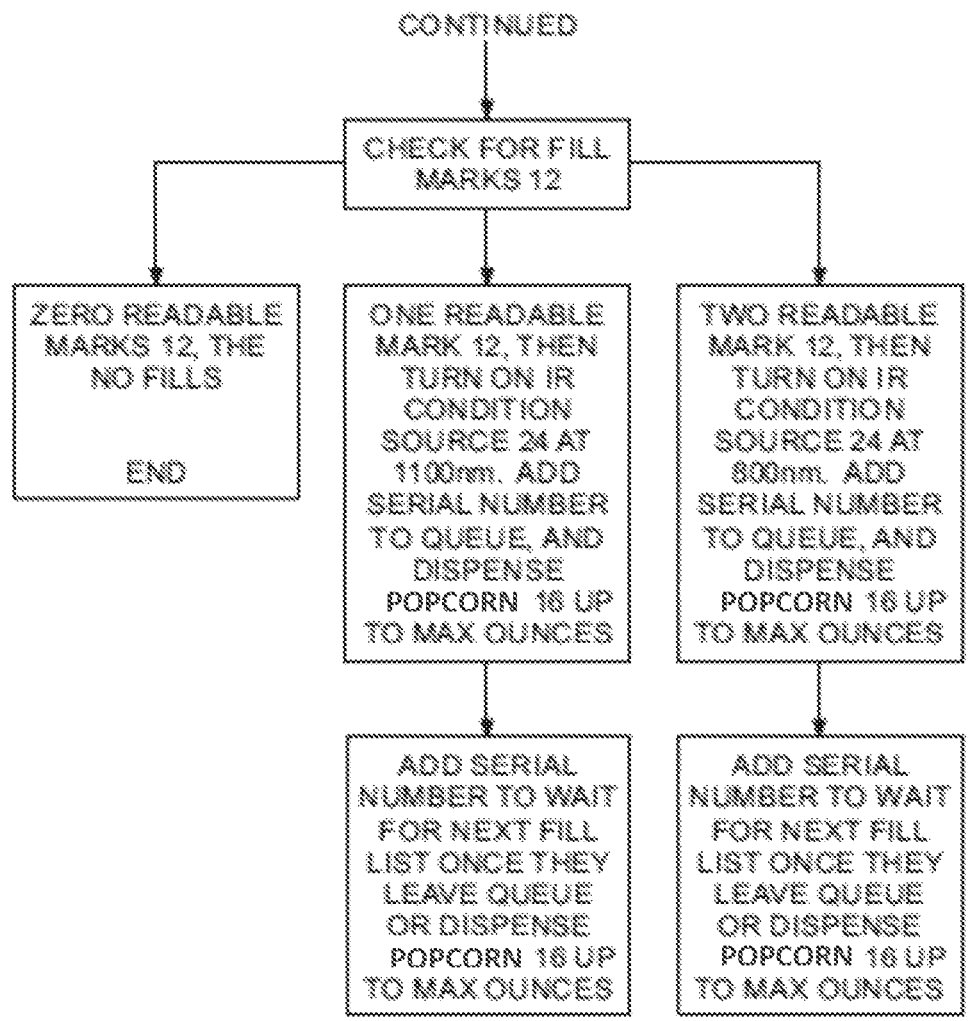

Referring to FIGS. 10-11B, embodiments of the system 10 can be incorporated to an existing design platform of a dispensing apparatus 18. For example, the dispensing apparatus 18 can be a new dispensing apparatus being manufactured or an existing dispensing apparatus 18 that is already being used to dispense popcorn 16 and/or additive. Any of the new dispensing apparatuses 18 may be configured for tracking. This can include conventional tracking methods and/or use of the inventive tracking methods. Any of the used dispensing apparatuses 18 may be configured for tracking, which may include conventional racking methods. Simple design changes and/or simple manufacturing process changes can be performed to facilitate incorporation of the inventive tracking system components to a new dispensing apparatus 18. Simple retrofitting can be performed to facilitate incorporation of the inventive tracking system components into a used dispensing apparatus 18. For example, FIG. 10 shows a tray 34 portion of dispensing apparatus 18.

A reader 20 and/or condition source 24 (e.g., one illustrated in FIG. 3, for example) may be installed within the drain of the tray 34. In some embodiments, a shield 44 may be installed at, near, or over the drain. The shield 44 may be configured as a filter to prevent unwanted or inadvertent exposure of a harmful condition (e.g., UV light) to a user. For instance, the shield 44 maybe a low-pass or high-pass filter to block UV light from exiting the tray 42 at an angle that would otherwise cause it to be incident upon a user. If a new or additional processor 22 is required for the dispensing apparatus 18 to be able to use any of the inventive system 10 components, the processor 22 can be configured to operate on the auxiliary power of the dispensing apparatus 18. However, the processor 22 may receive electrical power from other sources.

The inventive system 10 can be used to replace and/or augment conventional tracking technology. For example, FIGS. 11A-11B show an exemplary process flow that may be used for carrying out an embodiment of the inventive method. FIG. 11B is a continuation of FIG. 11A. FIGS. 11A-11B show a system that includes conventional tracking methods used in conjunction with the inventive tracking methods. With this exemplary embodiment, a user may place a popcorn container 14 on a tray 34 of a dispensing apparatus 18. The air pop feed 32 may be activated. Upon activation of the air pop feed 32, and before dispensing popcorn 16 and/or additive, the processor 22 may activate at least one of the reader and/or the condition source 24. The reader may be an RFID scanner and/or a camera, for example. The condition source 24 may be a visible light source, for example. The popcorn container 14 may be associated with a QR barcode marker 12 or an RFID tag marker 12. If the RFID tag marker 12 is readable and/or activated, the system 10 may dispense popcorn 16. If the QR barcode is readable, the QR barcode may be verified and/or validated. In some embodiments, both the RFID tag marker 12 and the QR barcode can have an assigned serial number generated when they are manufactured. When the RFID tag marker 12 tag or barcode is first presented to the system 10, the serial number(s) can be stored. Furthermore, a dispensed volume can be assigned to the serial number(s). In some embodiments, the dispensed volume can be assigned to the serial number(s) until: 1) a maximum allowed quantity of popcorn is dispenses (ounces, calories, sugar, etc.); and/or 2) a time limit has expired for the allowable time the popcorn container 14 is allowed for a fill. The system 10 may then determine if a serial number associated with the popcorn container 14 is within a queue. If the serial number is within the queue, the system 10 may dispense popcorn 16 and/or additive. If the serial number is not within the queue, the system 10 may determine if the serial number is in a waiting queue for a refill list. If the serial number is within the waiting queue for a refill list then the processor 22 may prevent dispensement of popcorn 16 and/or additive. If the serial number is not within the waiting queue for a refill list then the processor 22 may activate the condition source 24.

The system 10 may then determine if any fill marks 12 (e.g., identifiable marks indicating that a fill is allowed) are detectable and/or readable. If there are no readable fill marks, then the processor 22 may prevent dispensement of popcorn 16 and/or additive.

If there is one readable fill mark, then the processor 22 may activate the condition source 24. The condition source 24 may be a 1100 nm LED source. The system 10 may add the serial number to the queue. The processor 22 may then cause the system 10 to dispense popcorn 16 and/or additive. This may include dispensing popcorn 16 and/or additive up to a maximum amount that may be defined for the fill. The serial number may then be added to the waiting queue for the next fill once the serial number leaves the queue and/or dispensement of the maximum amount for the fill has occurred.

If there are two readable fill marks, the processor 22 may activate the condition source 24. The condition source 24 may be a 800 nm LED source. The system 10 may add the serial number to the queue. The processor 22 may then cause the system 10 to dispense popcorn 16 and/or additive. This may include dispensing popcorn 16 and/or additive up to a maximum amount that may be defined for the fill. The serial number may then be added to the waiting queue for the next fill once the serial number leaves the queue and/or dispensement of the maximum amount for the fill has occurred.

With the exemplary process flow described in FIGS. 11A-11B, it can be seen that conventional tacking methods can be used in conjunction with the inventive tracking methods. Further, the inventive tracking methods can be incorporated without any disruption or interference with the conventional tracking methods.

In some embodiments, the item 14, 14' can be re-usable, disposable, and/or recyclable. Some embodiments can facilitate use of re-usable, disposable, and/or recyclable items 14, 14 with little to no additional costs that may otherwise occur from the refillable, re-usable, and/or disposable nature of the items 14, 14'. For example, any of the items 14, 14' can be fabricated from plastic, glass, ceramic, metal, paper, pulp, etc. Including embodiments of the markers 12 disclosed herein with the items 14, 14' can allow for production of items 14, 14' that are re-usable, disposable, and/or recyclable without adding, or at least adding very little, to the normal costs associated with producing, re-using, and/or recycling such items 14, 14'. For example, any of the materials used to produce the markers 12 can be cost-effective, as well as re-usable, disposable, and/or recyclable. Further, any of the materials used to produce the markers 12 can be recycled in a compatible manner with the items 14, 14'. For example, the inks used for the marker 12 can be configured to not change the recyclability of the items 14, 14'. In some embodiments, any one or combination of dispensing apparatuses 18 can be used to track any one or combination of re-usable, disposable, and/or recyclable items 14, 14'.

The examples described herein are only exemplary. It should be understood that modifications to the embodiments disclosed herein can be made to meet a particular set of design criteria. For instance, the number of systems 10, markers 12, items 14, objects 16, dispensing apparatuses 18, readers 20, reset devices 36, tokens 14', popcorn container receptacles 38, condition sources 24, processors 22, printers 40, kernel storage compartments 33, additive storage compartments 35, air pop feeds 32, heating compartments 37, mixing compartments 39, openings 47, payment device 49, marker properties, conditions, and other properties, conditions, parameters, and/or components can be any suitable number of each to meet a particular objective. The particular configuration of type of such features and components can also be adjusted to meet a particular set of design criteria. Therefore, while certain exemplary embodiments have been discussed and illustrated herein, it is to be distinctly understood that the invention is not limited thereto but may be otherwise variously embodied and practiced within the scope of the claims following the detailed description.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A tracking device, comprising:
   at least one marker configured to be associated with a popcorn container and/or a token, the at least one marker having at least one property, the at least one property being identifiable to generate first tracking information, the popcorn container and/or the token being associated with a kernel, popped corn, and/or an additive;
   a popcorn dispensing apparatus configured to store the kernel and/or the additive, the popcorn dispensing apparatus further configured to generate the popped corn from the kernel and dispense the popped corn into the popcorn container;
   wherein the at least one property is modifiable, the at least one modified property being identifiable to generate second tracking information; and
   wherein the first tracking information and the second tracking information is used to identify, track, and/or monitor at least one attribute of the popcorn container and/or the token.

2. The tracking device recited in claim 1, wherein the first tracking information and the second tracking information is used to identify, track, and/or monitor:
   at least one attribute of the popcorn container and/or token; and/or
   at least one attribute of the kernel, the popped corn, and/or additive.

3. The tracking device recited in claim 1, wherein the at least one modified property is further modifiable.

4. The tracking device recited in claim 3, wherein the at least one property and/or the at least one modified property comprises at least one of a physical property, a chemical property, an optical property, a magnetic property, an electrical property, a programmed code, a readable property, a non-readable property, a pattern, and a disappearing property.

5. The tracking device recited in claim 3, wherein the at least one property and/or the at least one modified property is modifiable due to the at least one marker being subject to at least one condition.

6. The tracking device recited in claim 5, wherein being subject to the at least one condition comprises at least one of exposure to the at least one condition and removal from exposure to the at least one condition.

7. The tracking device recited in claim 6, wherein the at least one condition comprises at least one of electromagnetic radiation, an electric field, a magnetic field, a chemical, heat energy, pressure, acoustic energy, and physical contact.

8. The tracking device recited in claim 7, wherein the at least one condition further comprises at least one of magnitude, intensity, rate of change, frequency, and vector direction of the at least one condition.

9. The tracking device recited in claim 5, wherein the at least one property and/or the at least one modified property is modified by at least one of changing all at once, changing incrementally, changing as a function with which the at least one marker is subject to the at least one condition, and changing as a function of time.

10. The tracking device recited in claim 5, wherein the at least one property and/or the at least one modified property is modified by at least one of changing as a function of intensity, rate, and frequency with which the at least one condition occurs.

11. The tracking device recited in claim 3, wherein the at least one property comprises a plurality of properties and/or the at least one modified property comprises a plurality of modified properties.

12. The tracking device recited in claim 5, wherein a plurality of conditions generates a single change in a single property and/or a single change in a single modified property.

13. The tracking device recited in claim 5, wherein a single condition generates a change in a plurality of properties and/or a change in a plurality of modified properties.

14. The tracking device recited in claim 1, wherein the at least one property and/or the at least one modified property is identifiable and/or not identifiable by a reader.

15. The tracking device recited in claim 14, wherein the at least one property and the at least one modified property generates at least one readable state and/or at least one non-readable state.

16. A tracking system, comprising:
at least one marker associated with a popcorn container and/or a token, the at least one marker having at least one property, the at least one property being identifiable to generate first tracking information, wherein the at least one property is modifiable, the at least one modified property being identifiable to generate second tracking information, wherein the at least one property and/or the at least one modified property is modifiable due to the at least one marker being subject to at least one condition; and,
a popcorn dispensing apparatus, comprising:
at least one reader configured to capture the first tracking information and/or the second tracking information;
at least one condition source configured to subject the at least one marker to the at least one condition; and
at least one processor configured to receive and process the first tracking information and/or the second tracking information to identify, track, and/or monitor at least one attribute of the popcorn container and/or a token and/or use of the popcorn container and/or a token.

17. The tracking system recited in claim 16, further comprising a reset device.

18. A popcorn dispensing apparatus, comprising:
a kernel compartment configured to store at least one type of kernel;
an additive compartment configured to store at least one type of additive;
a heating compartment;
a means to transfer at least one of the kernel and additive in predetermined amounts to the heater compartment to transform the kernel into popped corn;
an air pop feed to dispense the popped corn to a popcorn container;
a reader configured to capture tracking information from a marker associated with the popcorn container;
a condition source configured to subject the marker to a condition; and
a processor configured to receive and process the tracking information to identify, track, and/or monitor at least one attribute of the popcorn container, the kernel, the additive, and/or the popcorn.

19. The popcorn dispensing apparatus recited in claim 18, further comprising a control module.

20. The popcorn dispensing apparatus recited in claim 18, further comprising a mixing compartment.

* * * * *